United States Patent Office 2,744,823
Patented May 8, 1956

2,744,823

SALT COMPOSITION

Horace W. Diamond, Chicago, Ill., assignor to Morton Salt Company, Chicago, Ill., a corporation of Illinois No Drawing. Application September 13, 1954, Serial No. 455,743

8 Claims. (Cl. 99—2)

This invention relates to the production of a dietary salt composition and more particularly, to the production of a superior dietary salt fortified with trace minerals.

The critical importance of what are known as trace elements to the physical well-being of animals is well known and in recent years, the purposeful addition of such elements to the animal diet has been practiced on an increasing scale.

For a variety of reasons, the addition of such trace mineral elements to common salt exemplified probably the most widespread usage of such materials, and it is with an improved technique for producing a trace mineralized product composed of common salt containing small amounts of these trace elements that the present invention is concerned.

The addition of trace mineral salts to common salt for use in the diet raises a number of problems. One of the most important of these is the practical impossibility of securing a permanent completely uniform mixture of these trace elements with the salt using the techniques ordinarily used. This difficulty is aggravated by the relatively small amounts of trace elements used in salt, by the differences in their physical and chemical nature, and by the tendency of a salt composition containing these elements which even though it may have been at one time fairly uniform in composition, to separate due to differences in particle size, density, and so on, particularly when shaken and jarred in handling and in shipping.

One of the principal objects of my invention is to provide a method for producing a trace mineralized salt wherein the trace minerals are uniformly distributed throughout the product.

A further object is to prevent the segregation of small amounts of finely powdered materials which are to be added to common salt. Another object is to minimize and even prevent the loss of trace elements which are to be added to common salt, due to segregation and dusting, during handling and manufacturing of the product.

In the accomplishment of these objects, my invention embraces the concept of associating with trace element materials which are to be added to common salt, or with the salt itself, or with mixtures of both, a liquid which coats the crystals and makes the salt non-free-flowing. More specifically, my invention involves the use of a non-toxic liquid which will not evaporate and which will keep small amounts of finely powdered trace elements from segregating and dusting in the production of common salt containing such trace mineral elements.

The following examples will serve to document a number of successful specific embodiments of the invention, and illustrate the flexibility of the invention particularly with respect to the types of liquids that can be used to prevent the occurrence of segregation of trace minerals in the salt.

EXAMPLE I

In accordance with a preferred embodiment of my invention, trace elements, in the form of finely powdered salts of cobalt, copper, iodine, zinc, manganese, and iron were thoroughly mixed with common salt at room temperature. 0.1% (based on the common salt) of propylene glycol was added and the batch again thoroughly mixed. The resulting product was free of dusting, segregation and was homogeneous with respect to composition.

The finished product had the following composition:

| | Percent |
|---|---|
| Cobalt oxide | 0.0152 |
| Copper carbonate | 0.0660 |
| $Fe_2O_3$ | 0.1146 |
| Ferro mangano phosphate (as described in U. S. Patent No. 2,603,566) | 0.6480 |
| Zinc carbonate | 0.0098 |
| 3,5 diiodosalicylic acid | 0.0124 |
| Propylene glycol | 0.0962 |

The remainder of the mixture was salt.

All of the above solids except the ferro mangano phosphate were of a particle size that passed through a 100 mesh screen. The ferro mangano phosphate had a particle size such that 60% passed through a 100 mesh screen.

Propylene glycol is surprisingly superior to such products as molasses which has been used in previous attempts to eliminate segregation of trace elements in the production of trace mineralized salt. Molasses being a more viscous and sticky liquid than propylene glycol has a tendency to "shot ball" or form small balls of minerals which are very difficult to break and mix with the batch. Furthermore, molasses adheres to the sides and paddles of the mixer and after drying out flakes off, pulling scale into the batch mixture.

By way of a comparison, samples of trace mineralized salt made with propylene glycol, as above described, were compared in a number of characteristics with trace mineralized salt made in the same way except that molasses was used instead of propylene glycol.

All of the samples tested were placed in paper bags and dropped on a table to simulate in a general way, the handling and shaking that a bag of trace mineralized salt gets in transit. The samples were then analyzed by removing portions from the top and bottom of the bag.

For purposes of comparison, manganese was selected as a measure of segregation since ferro mangano phosphate, which was used as the manganese component in these compositions, is the material which is most susceptible to segregation.

Analysis of samples made using molasses showed a manganese content of about 0.16% at the top of the sample and 0.39% at the bottom of the sample. An analysis of samples made using propylene glycol showed a uniform manganese content of 0.27% at both top and bottom of the samples.

EXAMPLE II

A trace-mineralized salt was prepared with the following composition:

| | Percent |
|---|---|
| Cobalt oxide | 0.0289 |
| Copper carbonate | 0.0890 |
| Iron oxide | 0.0681 |
| Zinc carbonate | 0.0134 |
| Ferro mangano phosphate | 3.5509 |
| Potassium iodide (+10% magnesium carbonate) | 0.0370 |
| Hyposulfite of soda | 0.0640 |
| Soda ash | 0.0100 |

The remainder of the mixture was salt.

Aliquot portions of the above mixture were treated as in Example I except that white mineral oil (liquid petrolatum), was, in varying amounts based on the total mix, used in lieu of propylene glycol.

Results of the segregation tests were as follows:

Table 1

| Mineral Oil Content of mix | Manganese Content | |
|---|---|---|
| | top of sample | bottom of sample |
| Percent | Percent | Percent |
| 0.0 | 1.74 | 1.31 |
| 0.15 | 1.95 | 1.64 |
| 0.30 | 1.57 | 1.42 |
| 0.45 | 1.50 | 1.62 |

The above data illustrates the effect of mineral oil in controlling segregation.

In additional tests sorbitol and propylene glycol were used in place of mineral oil, with the trace mineralized salt mix of Example II, and the difference in manganese content between top and bottom of the samples, was very close to the differences shown with mineral oil in Example II, table 1, for corresponding concentrations.

Besides propylene glycol, sorbitol, and mineral oil, I can of course, use other liquids, including humectant materials like polyhydric alcohols such as glycerine, mannitol, and the like, providing that such liquids have the property of coating a salt crystal so as to make the salt non-free-flowing. Of course, some liquids function better than others in preventing segregation of trace minerals in salt mixes. In this connection, it may be pointed out that humectant liquids have one advantage over non-humectants, insofar as this invention is concerned; namely the former will absorb moisture which in itself is a satisfactory liquid for preventing segregation, and therefore somewhat less humectant can be used than in the case of non-humectants.

The amount of treating material that can be used is variable. We have found that about 0.1% of the treating liquid is quite satisfactory, although as much as 2% and as little as 0.01%, may be used, based on the weight of the total mix.

While a preferred way to produce the uniform trace mineralized salt product of this invention is, as above pointed out, first mixing together the dry components prior to adding the treating liquid, thereto, it is also possible, of course, to mix all of the components simultaneously or to mix the common salt with the treating liquid and then add the trace mineral products.

It is to be understood of course, that the above embodiments are purely illustrative and that various other modifications within the basic concept of my invention may be employed and will suggest themselves to those skilled in the art. Accordingly, it is not intended that the above examples be construed in a limiting sense for these reasons.

I claim:

1. A trace mineralized salt composition comprising a homogeneous mixture of common salt, inorganic trace mineral element compounds, and from about 0.01% to 2.0% of a liquid polyhydric alcohol.

2. A trace mineralized salt composition comprising a uniform mixture of common salt, trace mineral element inorganic compounds, and from about 0.01% to 2.0% of propylene glycol.

3. A trace mineralized salt product comprising a uniform mixture of common salt, trace mineral element inorganic compounds and from about 0.01% to 2.0% of an edible mineral oil.

4. A trace mineralized salt product comprising a uniform mixture of common salt, trace mineral element inorganic compounds and from about 0.1% to about 2.0% of propylene glycol.

5. A mineral salt composition comprising common salt in uniform admixture with finely divided trace mineral element inorganic compounds and a member selected from the group consisting of mannitol, sorbitol, propylene glycol, and mineral oil, in amount ranging from about 0.01% to 2.0% based on the weight of the dry mix.

6. A trace mineralized salt composition comprising a homogeneous mixture of common salt, trace mineral element inorganic compounds, an organic iodine compound, and from about 0.01% to 2.0% of a liquid polyhydric alcohol.

7. A trace mineralized salt composition comprising a homogeneous mixture of common salt, trace mineral element inorganic compounds, an organic iodine compound, and from about 0.01% to 2.0% of an edible mineral oil.

8. A process of producing a trace element mineralized salt composition characterized by its lasting compositional uniformity which comprises mixing together until substantial homogeneity is reached a major portion of common salt, a minor portion of trace mineral element inorganic compounds, and from about 0.01% to 2.0% of a liquid polyhydric alcohol.

References Cited in the file of this patent

UNITED STATES PATENTS

| 1,637,428 | Rupp | Aug. 2, 1927 |
| 2,056,540 | Segura | Oct. 6, 1936 |
| 2,183,173 | Segura | Dec. 12, 1939 |
| 2,234,484 | Weinig | Mar. 11, 1941 |
| 2,489,762 | Dunn et al. | Nov. 29, 1949 |
| 2,511,804 | Hall et al. | June 13, 1950 |